US009342692B2

(12) United States Patent
Agrawal et al.

(10) Patent No.: US 9,342,692 B2
(45) Date of Patent: May 17, 2016

(54) NEUTRALIZING PROPAGATION OF MALICIOUS INFORMATION

(71) Applicant: International Business Machines Corporation, Armonk, NY (US)

(72) Inventors: Priyanka Agrawal, Bangalore (IN); Prithu Banerjee, Bangalore (IN); Ravindranath Kokku, Bangalore (IN); Satya Rama Kumar Pasumarthi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 14/013,786

(22) Filed: Aug. 29, 2013

(65) Prior Publication Data

US 2015/0067849 A1    Mar. 5, 2015

(51) Int. Cl.
| H04L 29/06 | (2006.01) |
| G06F 17/30 | (2006.01) |
| G06F 21/56 | (2013.01) |
| G06F 21/55 | (2013.01) |

(52) U.S. Cl.
CPC ............. *G06F 21/56* (2013.01); *G06F 21/55* (2013.01); *H04L 63/145* (2013.01); *H04L 63/1416* (2013.01)

(58) Field of Classification Search
CPC ........ G06F 17/30; G06Q 50/01; H04L 29/06; H04L 51/32; H04L 63/14; H04L 63/20
USPC ............ 726/22; 709/201, 202, 217, 218, 223, 709/224
See application file for complete search history.

(56) References Cited

U.S. PATENT DOCUMENTS

| 8,375,024 | B2 | 2/2013 | Goeldi | |
| 2008/0256233 | A1* | 10/2008 | Hall et al. | 709/224 |
| 2012/0158630 | A1* | 6/2012 | Zaman et al. | 709/224 |
| 2012/0185611 | A1* | 7/2012 | Reynolds | 709/246 |
| 2012/0296965 | A1 | 11/2012 | Srivastava | |

(Continued)

FOREIGN PATENT DOCUMENTS

| CN | 103049789 A | 4/2013 |
| WO | WO2013010698 | 1/2013 |

(Continued)

OTHER PUBLICATIONS

He, Xinran, Guojie Song, Wei Chen, and Qingye Jiang. "Influence Blocking Maximization in Social Networks under the Competitive Linear Threshold Model." In SDM, pp. 463-474. 2012.*

(Continued)

*Primary Examiner* — Joseph P Hirl
*Assistant Examiner* — Kalish Bell
(74) *Attorney, Agent, or Firm* — Ference & Associates LLC

(57) ABSTRACT

Methods and arrangements for controlling a spread of malicious information in a network. A viral spread of information is tracked, in a network comprising interconnected nodes. Malicious information in the viral spread of information is identified. A topic-specific sub-network of nodes prone to be affected by the malicious information is predicted, and the effect of the malicious information at the sub-network of nodes is neutralized, via initiating a spread of neutralizing information to the sub-network of nodes. Other variants and embodiments are broadly contemplated herein.

11 Claims, 3 Drawing Sheets

(56) References Cited

U.S. PATENT DOCUMENTS

| | | | |
|---|---|---|---|
| 2012/0324008 | A1 | 12/2012 | Werz, III et al. |
| 2013/0041860 | A1 | 2/2013 | Lawrence et al. |
| 2013/0091223 | A1 | 4/2013 | DeLuca et al. |
| 2013/0117364 | A1 | 5/2013 | Bania et al. |
| 2014/0237093 | A1* | 8/2014 | Hofman et al. ............... 709/223 |
| 2014/0258402 | A1* | 9/2014 | Nama et al. .................... 709/204 |
| 2014/0274246 | A1* | 9/2014 | Tsai et al. .......................... 463/9 |
| 2014/0280610 | A1* | 9/2014 | Chen et al. .................... 709/206 |
| 2014/0304343 | A1* | 10/2014 | Skiba et al. ................... 709/206 |

FOREIGN PATENT DOCUMENTS

| | | |
|---|---|---|
| WO | WO2013062963 | 5/2013 |
| WO | WO2013063416 | 5/2013 |

OTHER PUBLICATIONS

Baccianella, Stefano et al., "SentiWordNet 3.0: An enhanced Lexical Resource for Sentiment Analysis and Opinion Mining," Proceedings of LREC, 7th Conference on Language Resources and Evaluation, Valetta, Malta, May 17-23, 2010, pp. 2200-2204. Can be found at http://www.lrec-conf.org/proceedings/lrec2010/pdf/769_Paper.pdf.

Seo, Eunsoo et al., "Identifying Rumors and Their Sources in Social Networks," Proceedings SPIE, May 1, 2012, 13 pages. Can be found at http://spirit.cs.ucdavis.edu/pubs/conf/prasant-spie12.pdf.

Budak, Ceren et al., "Limiting the Spread of Misinformation in Social Networks," International World Wide Web Conference, WWW 2011, Hyderabad, India, Mar. 28-Apr. 1, 2011, pp. 665-674, ACM Digital Library.

Nagy, Ahmed et al., "Crowd Sentiment Detection during Disasters and Crises," Proceedings of the 9th International ISCRAM Conference, Vancouver, Canada, Apr. 2012, pp. 1-9, Rothkrantz, L. et al., Editors. Can be found at http://www.iscramlive.org/ISCRAM2012/proceedings/197.pdf.

Zhao, Xiaxia et al., "Dynamical Model about Rumor Spreading with Medium," Research Article, pp. 1-9, Jan. 22, 2013, vol. 2013, Article ID 586867, Hindawi Publishing Corporation, Discrete Dynamics in Nature and Society. Available at http://dx.doi.org/10.1155/2013/586867.

Qazvinian, Vahed et al., "Rumor has it: Identifying Misinformation in Microblogs," Proceedings of the 2011 Conference on Empirical Methods in Natural Language Processing, Edinburgh, Scotland, UK, Jul. 27-31, 2011, pp. 1589-1599, Association for Computational Linguistics, Stroudsburg, Pennsylvannia, USA.

Lakkaraju, Himabindu, et al., "Exloiting Coherence for the Simultaneous Discovery of Latent Facets and associated Sentiments," SIAM (Society for Industrial and Applied Mathematics), 2011, pp. 498-509. Can be found at http://eprints.iisc.ernet.in/46014/1/siam_int_con_dat_min_498_2011.pdf.

Blei, David M. et al., "Latent Dirichlet Allocation," Journal of Machine Learning Research, Jan. 2003, pp. 993-1022, Microtome Publishing, Brookline, Massachusetts, USA.

Blei, David M. et al., "The nested Chinese restaurant process and Bayesian nonparametric inference of topic hierarchies," Journal of the ACM, 2009, 32 pages. Found at http://www.cs.princeton.edu/~blei/papers/BleiGriffithsJordan2009.pdf.

Acemoglu, Daron et al., "Spread of Misinformation in Social Networks," Cornell University Library, Jun. 26, 2009, 58 pages. Can be found at http://arxiv.org/abs/0906.5007.

* cited by examiner

NEUTRALIZING PROPAGATION OF MALICIOUS INFORMATION

BACKGROUND

Generally, a very large number of users are connected throughout the world via mobile phones, the Internet and other electronic media, with an immense scale of information sharing involved. It is often difficult for the typical information consumer to detect if information is correct or not. Sometimes rumors (such as those related to destructive events, natural disasters, etc.), which are unchecked at early stages of their spread, lead to a massive spread of incorrect or misleading information throughout a large network. Such situations then become difficult to resolve, short of shutting down at least significant portions of a network.

BRIEF SUMMARY

In summary, one aspect of the invention provides a method of controlling a spread of malicious information in a network, the method comprising: utilizing at least one processor to execute computer code configured to perform the steps of: tracking a viral spread of information in a network comprising interconnected nodes; identifying malicious information in the viral spread of information; predicting a topic-specific sub-network of nodes prone to be affected by the malicious information; and neutralizing the effect of the malicious information at the sub-network of nodes, via initiating a spread of neutralizing information to the sub-network of nodes.

Another aspect of the invention provides an apparatus for controlling a spread of malicious information in a network, the apparatus comprising: at least one processor; and a computer readable storage medium having computer readable program code embodied therewith and executable by the at least one processor, the computer readable program code comprising: computer readable program code configured to track a viral spread of information in a network comprising interconnected nodes; computer readable program code configured to identify malicious information in the viral spread of information; computer readable program code configured to predict a topic-specific sub-network of nodes prone to be affected by the malicious information; and computer readable program code configured to neutralize the effect of the malicious information at the sub-network of nodes, via initiating a spread of neutralizing information to the sub-network of nodes.

An additional aspect of the invention provides a computer program product for controlling a spread of malicious information in a network, the computer program product comprising: a computer readable storage medium having computer readable program code embodied therewith, the computer readable program code comprising: computer readable program code configured to track a viral spread of information in a network comprising interconnected nodes; computer readable program code configured to identify malicious information in the viral spread of information; computer readable program code configured to predict a topic-specific sub-network of nodes prone to be affected by the malicious information; and computer readable program code configured to neutralize the effect of the malicious information at the sub-network of nodes, via initiating a spread of neutralizing information to the sub-network of nodes.

A further aspect of the invention provides a method comprising: identifying malicious information spreading in an information-exchange network; classifying at least one topic of the malicious information; determining a potential sub-network for future spread of the malicious information based on the at least one topic classified; and attenuating a potential future spread of the malicious information via at least one of: automatically propagating a countervailing message to the potential sub-network; and prompting manual intervention for propagating a countervailing message to the potential sub-network.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
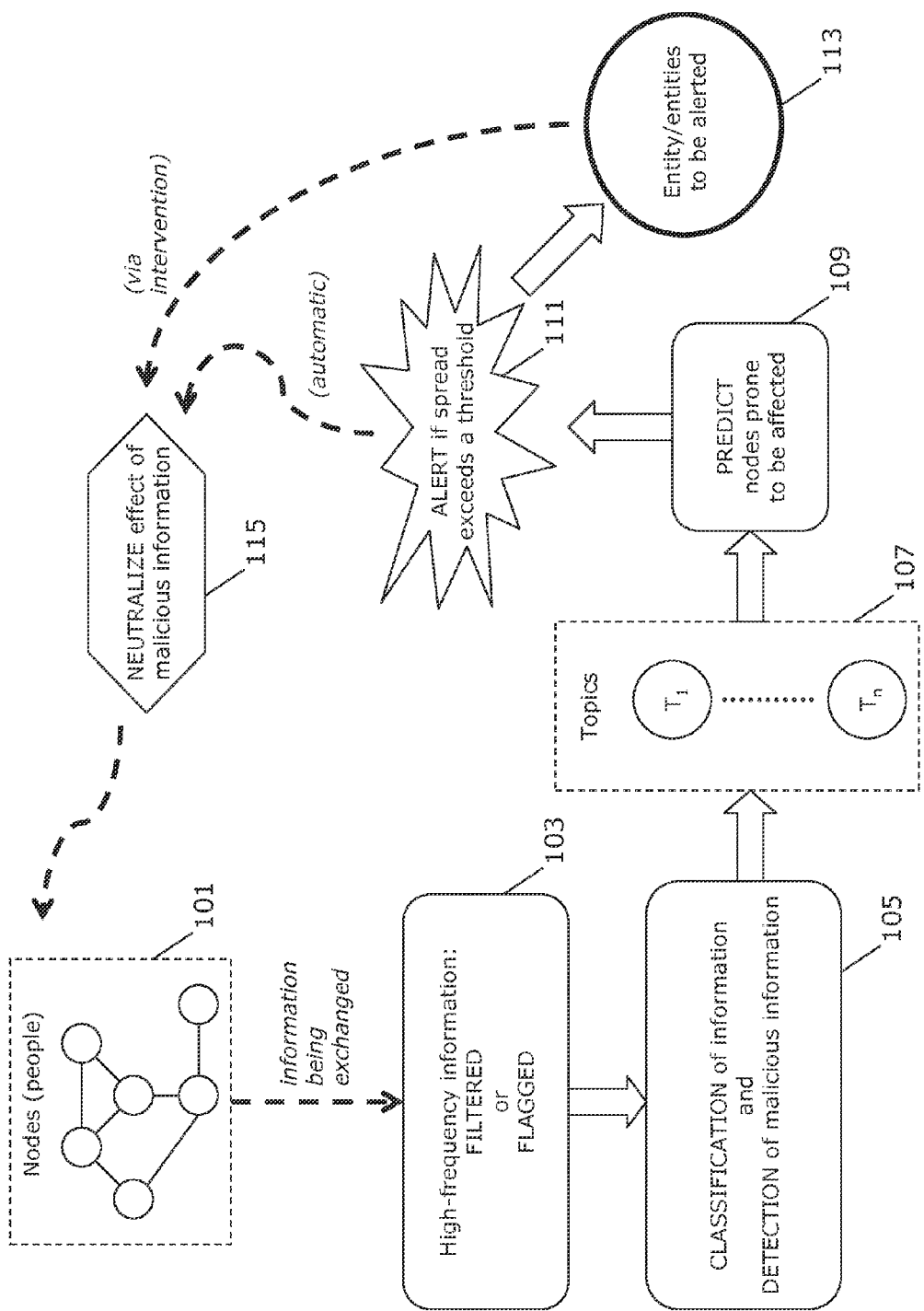
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Generally, it is recognized that keeping track of the spread of rumors is very important. Governments and others have seen a need for an automated mechanism in that connection. Accordingly, embodiments of the invention involve an efficient mechanism to curb the further spread of the malicious information as early as possible. This can involve greater penalties for sources that generated the rumors. As such, over-reaching measures often involve a restriction of many or all users from exchanging any information in such a situation. Embodiments of the invention thus attend to a rapid detection and neutralization of the spread of malicious information on a network.

In accordance with at least one embodiment of the invention, three major phases are involved. In a detection phase, the system identifies potentially malicious information, which is then sent to a central authority to validate its malicious intent. The system detects if certain high-frequency information (i.e., viral) in the network is potentially malicious by identifying a sentiment of the underlying facets of the exchanged information or by using crowdsourcing. In a prediction phase, the system then identifies the nodes already infected with the malicious information and predicts the nodes which could potentially get infected in the near future based on the topics to which the nodes and the message have affinity to.

In accordance with at least one embodiment of the invention, in a neutralizing phase, the system chooses the appropriate set of starting nodes (which are unique to the topic affinities of the message) to maximize the spread of neutralizing information to the predicted nodes.

Broadly contemplated herein, in accordance with at least one embodiment of the invention, are methods and systems for discovering an underlying set of topics associated with one or more aspects of viral information spreading in a network, by way of identifying a spread of harmful or malicious information. Also contemplated is a prediction of a topic-specific sub-network of nodes that are prone to be affected, and a neutralization of an effect of a malicious information spread at these nodes, via initiating neutralizing information at a topic-specific set of starting nodes. Viral information in a network is first discovered, based on a threshold relating to the number of times that information has been shared in a given time period. (In other words, information in the network is determined to be "viral" once such information is determined to have been shared at a rate [e.g., a number of times over a predetermined time period] that exceeds a predetermined threshold.) Once discovered, underlying facets and associated sentiments in the viral information are discovered, and potentially malicious information is detected (e.g., via explicit tagging by users or an automatic processing of data).

In accordance with at least one embodiment of the invention, nodes (e.g., individuals, groups or establishments) prone to be affected by a spread of malicious information are identified by inferring an underlying network of diffusion. This network is inferred, in particular, via using diffusion behavior of information shared in the past on the same or similar topics, and the affinity of users to these topics. Neutralizing information is sent to the nodes proactively, or a campaign is initiated on a starting set of nodes (uniquely identified by topic affinities of the message) with neutralizing information that spreads to the nodes and beyond before the malicious information reaches.

FIG. 1 schematically illustrates a system architecture, in accordance with at least one embodiment of the invention. Nodes in a network 101 can include people, groups or establishments, or essentially any other entity that might possess a mobile phone, social network account, email address or other avenue for electronic communication with others in a network. Broadly contemplated herein are methods and arrangements for detecting and neutralizing a spread of malicious information in network 101 via topic-based classification, and inferring topic-based sub-networks of nodes. Particularly, as different nodes present affinities to given topics, a set of nodes prospectively affected by a spread of malicious information can be different based on the topic(s) inherent in such information. Hence, the diffusion pathways of a message can depend on the affinity of nodes to topics associated with the message.

In accordance with at least one embodiment of the invention, as information is generally exchanged between nodes in network 101, high-frequency information is noted (103) and either filtered, based on a threshold, or expressly flagged by users. The threshold can be based, e.g., on a certain number of messages going through the network over a predetermined time period, on a single topic or related set of topics.

As such, in accordance with at least one embodiment of the invention, it can be appreciated that as the amount of information exchanged over network 101 may be infeasible, it may well be computationally infeasible to analyze each and every message. Thus, the frequency at which an aspect of information is being shared across the network is tracked and, if the number of times the aspect is shared in a given period of time exceeds the threshold, it is categorized as viral. The higher the frequency of sharing an aspect of information, the greater the spread of the aspect this represents, and thus a greater likelihood that it has gone viral. If users flag an aspect of information as malicious, it can be categorized as viral if a sufficient number of users have flagged it above a predetermined threshold. The system may start with a lower threshold to avoid missing any malicious rumor and, thereafter, adaptively adjust the threshold based on any false positives and false negatives. (As such, in order to determine false positives or negatives, random samples can be inspected by an expert. At step 113, referred to in more detail herebelow, false positives can be determined by feedback from one or more knowledgeable entities. False negatives, on the other hand, can be determined at step 103 by random sampling, with feedback from one or more knowledgeable entities.)

Then, in accordance with at least one embodiment of the invention, high-frequency information is classified (105) based on facets or sentiments. Text and/or images, for instance, can be used in such classification, either through a suitable automatic arrangement or through mechanical input (e.g., via Internet crowdsourcing employed to perform complex tasks). More particularly, types of information or data exchanged in network 101, which can be employed in classification 105, may be represented by text (based on keywords, phrases, context, etc.) and/or images or videos (based on filenames or headers of the content, matching random locations, generated signatures, image recognition, etc.). Classification can be rendered into predetermined topics or topic areas. In the present example, as shown, $T_1 \ldots T_n$ represent topics (107) to which entities (e.g., governments, organizations, social groups, etc.) may subscribe (e.g., to single topics or to subsets thereof) in order to receive alerts. (Generally, there are different ways in which an association can be made between topics and entities, e.g., to determine which entities might be affected by a spread of malicious information regarding a particular topic. This can be accomplished, for example, in a network-agnostic manner based on historical data relating to the spread of information. In network-specific settings, on the other hand, a topic can specify a seed-set of nodes and network structure, thereby helping determine determines which entities might become affected by malicious information spread.)

Generally, in accordance with at least one embodiment of the invention, the flow of a newly identified rumor (or aspect of malicious information) can be predicted on the basis of past rumors (or aspects of malicious information) and their diffusion through network 101, thus permitting an efficient "learned" approach to stop the flow of a currently propagating rumor (or aspect of malicious information). In other words, because a message can be mapped to topics, a system as broadly contemplated herein can improve itself automatically by learning from historical experiences in the spread of information, malicious or otherwise, through networks.

In accordance with at least one embodiment of the invention, it can be appreciated that classification (105) helps in discovering latent facets and associated sentiments. Particularly, viral information could span a wide range of possibilities and classification can help distinguish potentially harmful or malicious information from that which may be more benign. In this vein, conventional systems tend to lack this capacity. A classification model as contemplated herein, however, can deal with a wide variety of data.

In accordance with at least one embodiment of the invention, information is classified, based on underlying facets, using a Bayesian model. For the identified facets, sentiments are then determined, ranging from "highly positive" to "neutral" to "extremely negative". (A wide variety of arrangements for analyzing sentiments can be used with embodiments of the invention; one illustrative and non-restrictive example is SentiWordNet, a publicly available lexical resource for text analysis and opinion mining. [See, e.g., S. Baccianella et al: "SentiWordNet 3.0: An Enhanced Lexical Resource for Sentiment Analysis and Opinion Mining", 7th Conference on Language Resources and Evaluation {LREC"10}, Valletta, Malta, 2010, pp. 2200-2204.]) Based on the discovered facets and their sentiments, an information aspect can be classified as malicious. (In accordance with a refinement, new facets and sentiments can also be discovered with the help of a nonparametric Bayesian model.)

In accordance with at least one embodiment of the invention, information spread can be predicted (109) via topic-based network inference. Particularly, associations between topics and nodes can be leveraged to predict (109) those nodes that will be affected in the event that a spread of malicious information regarding one or more topics exceeds a predetermined threshold. In that connection, a system as contemplated herein can learn an underlying network using historical information, and predict the paths of diffusion for malicious information. Diffusion strength or impact between nodes is modeled on a basis of topics associated with nodes, and newly diffusing information that has been classified as malicious. In this manner, those nodes which could potentially get infected in the near future can be identified in a network-specific manner.

As such, in accordance with at least one embodiment of the invention, if indeed a potential spread of malicious information with relation to one or more topics exceeds such a threshold, an alert (111) can be sent out to an appropriate entity 113. At the same time, the effect of the malicious information among nodes 101 can be neutralized (115). Thus, neutralization can be initiated automatically when the threshold is exceeded, or via intervention from an entity or entities being alerted (e.g., once an entity approves a neutralization order in response to the alert).

For information neutralization (115), in accordance with at least one embodiment of the invention, neutralizing information is propagated among nodes in network 101 in such a manner that the spread of malicious information is stemmed. An appropriate set of starting nodes is chosen to maximize the spread of neutralizing information and any positive sentiments associated therewith, based on an assumption that once a node receives neutralizing information from a reliable source, it will not spread any malicious information if subsequently received. On the other hand, if an alerted entity (113) finds malicious information to be a particular threat (e.g., for its own interests or in its own context), it can take a corrective action, e.g., for targeted information dissemination to entities that have been, or could be affected, to block a further potential spread of a specific information item; such action can also prompt a broadcasting of neutralizing information via alternate channels.

Figure 2:
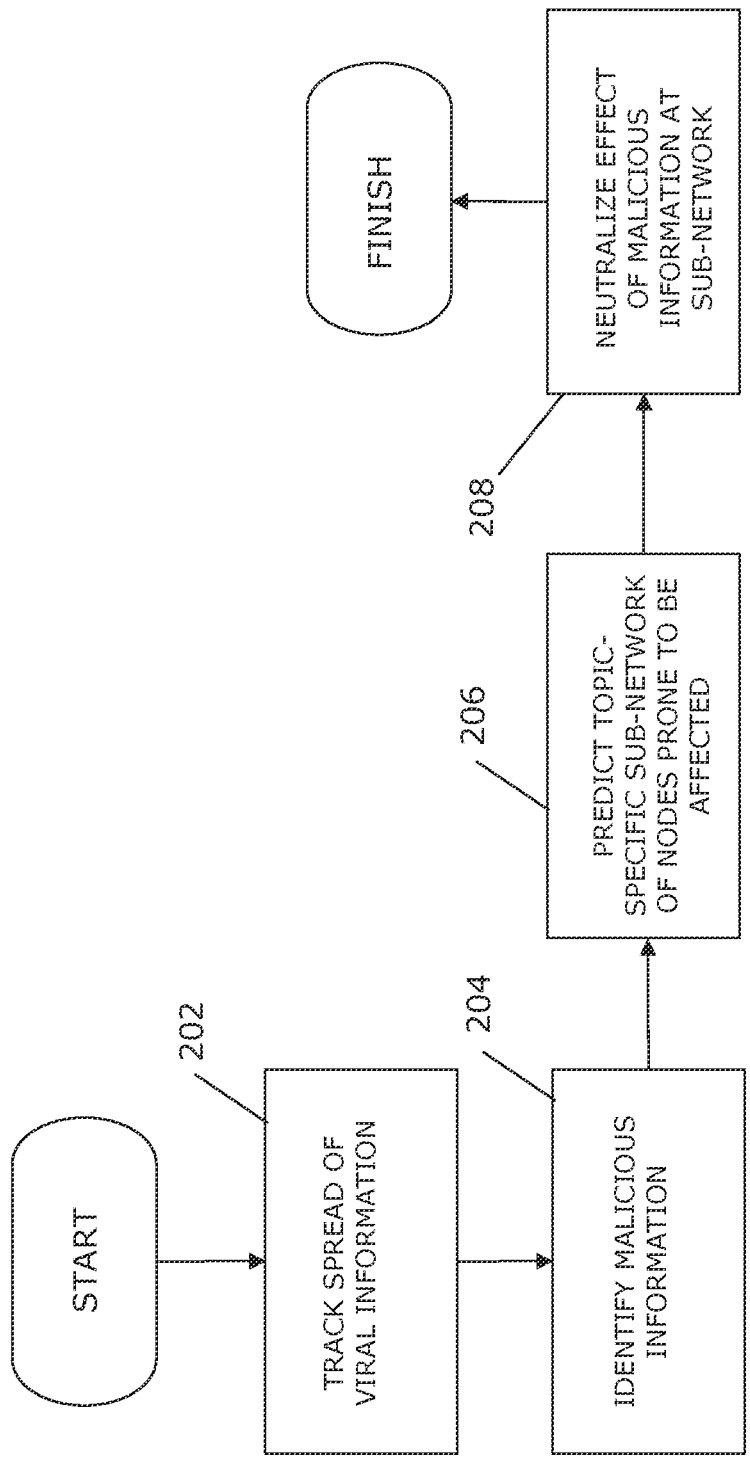
FIG. 2 sets forth a process more generally for controlling a spread of malicious information in a network.

FIG. 2 sets forth a process more generally for controlling a spread of malicious information in a network, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, a viral spread of information is tracked, in a network comprising interconnected nodes (202). Malicious information in the viral spread of information is identified (204). A topic-specific sub-network of nodes prone to be affected by the malicious information is predicted (206), and the effect of the malicious information at the sub-network of nodes is neutralized, via initiating a spread of neutralizing information to the sub-network of nodes (208).

Figure 3:
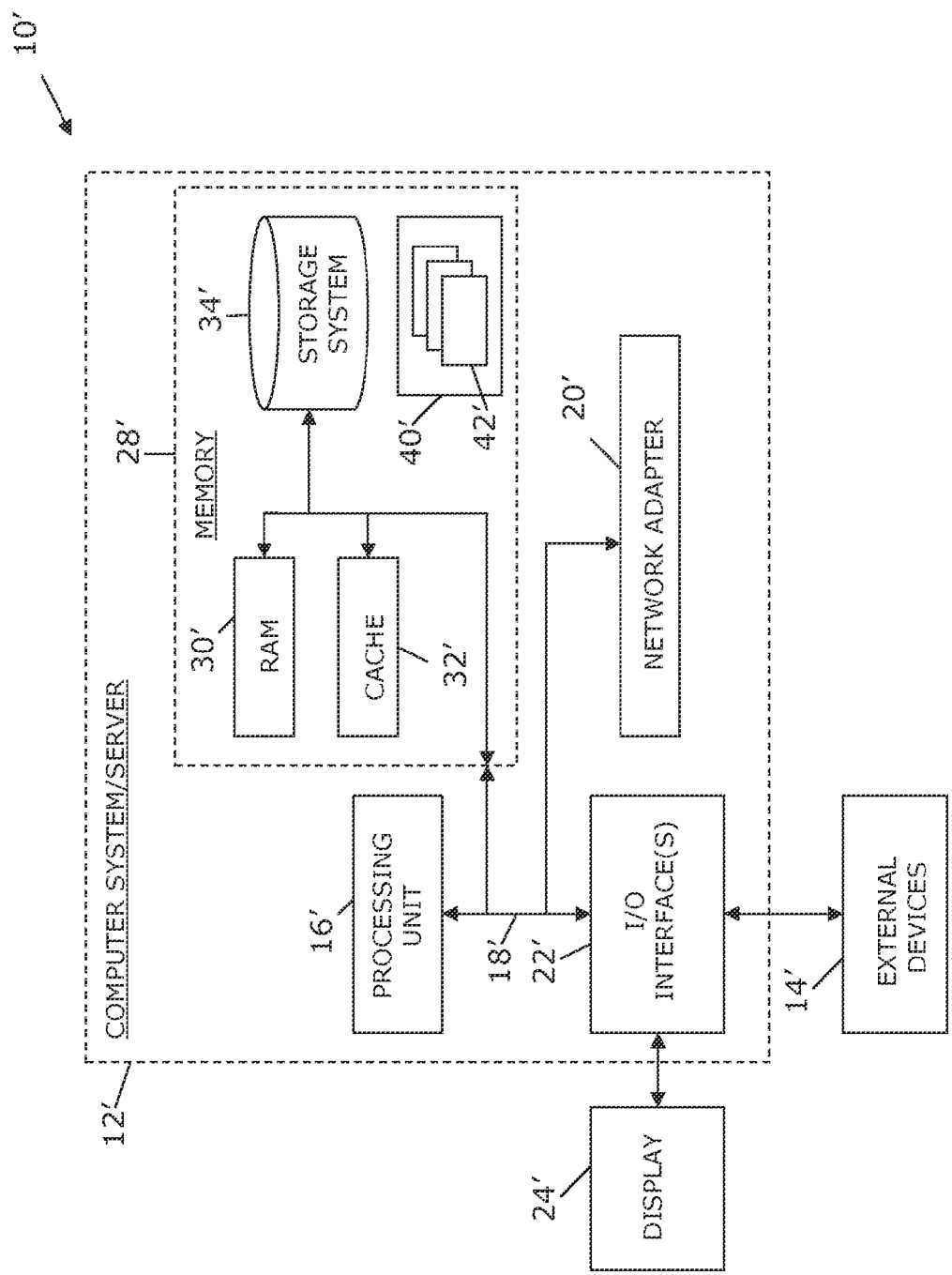
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of controlling a dissemination of incorrect information in an electronic communication network, said method comprising:
    utilizing at least one processor to execute computer code configured to perform the steps of:
    detecting a number of times that a specific piece of information has been shared electronically in the electronic communication network;
    wherein said detecting comprises determining that the number of times has exceeded a predetermined threshold;
    identifying, using a directed acyclic graph, that the specific piece of information is incorrect by identifying topics associated with the specific piece of information and determining sentiments based upon the identified topics;
    determining at least one entity that has previously received the specific piece of information:
    predicting at least one other entity is susceptible to receiving the specific piece of information, wherein the predicting is based on a relationship of the at least one other entity and the at least one entity and wherein the predicting is based on the identified topic associated with the specific piece of information; and
    automatically neutralizing the specific piece of information, via initiating at a set of entities a dissemination of correct information.

2. The method according to claim 1, wherein said identifying of the specific information comprises identifying incorrect information via one or more of: user tagging and automatic data processing.

3. The method according to claim 1, wherein said predicting comprises identifying the relationship of the at least other entity and the at least one entity via consulting historical diffusion in the network of information relating to the topic associated with the specific piece of information.

4. The method according to claim 3, wherein said identifying of the relationship of the at least one other entity and the at least one entity comprises determining an affinity of at least one of the entities to the at least one topic.

5. The method according to claim 1, wherein said neutralizing the incorrect specific piece of information comprises initiating the dissemination of the correct information automatically upon exceeding the predetermined threshold at the at least one entity that has previously received the specific piece of information.

6. An apparatus for controlling a dissemination of incorrect information in an electronic communication network said apparatus comprising:
    at least one processor; and
    a computer readable storage medium having computer readable program code embodied therewith and executable by the at least one processor, the computer readable program code comprising:

computer readable program code configured to detect a number of times that a specific piece of information has been shared electronically in the electronic communication network;

wherein the detecting comprises determining that the number of times has exceeded a predetermined threshold;

computer readable program code configured to identify, using a directed acyclic graph, that the specific piece of information is incorrect by identifying topics associated with the specific piece of information and determining sentiments based upon the identified topics;

computer readable program code configured to determine at least one entity that has previously received the specific piece of information;

computer readable program code configured to predict at least one other entity is susceptible to receiving the specific piece of information, wherein the predicting is based on a relationship of the at least one other entity and the at least one entity and wherein the predicting is based on the identified topic associated with the specific piece of information; and computer readable program code configured to automatically neutralize the specific piece of information, via initiating at a set of entities a dissemination of correct information.

7. A computer program product for controlling a dissemination of incorrect information in an electronic communication network, said computer program product comprising:

a non-transitory computer readable storage medium having computer readable program code embodied therewith, the computer readable program code comprising:

computer readable program code configured to detect a number of times that a specific piece of information has been shared electronically in the electronic communication network;

wherein the detecting comprises determining that the number of times has exceeded a predetermined threshold;

computer readable program code configured to identify, using a directed acyclic graph, that the specific piece of information is incorrect by identifying topics associated with the specific piece of information and determining sentiments based upon the identified topics;

computer readable program code configured to determine at least one entity that has previously received the specific piece of information;

computer readable program code configured to predict at least one other entity is susceptible to receiving the specific piece of information, wherein the predicting is based on a relationship of the at least one other entity and the at least one entity and wherein the predicting is based on the identified topic associated with the specific piece of information; and computer readable program code configured to automatically neutralize the specific piece of information, via initiating at a set of entities a dissemination of correct information.

8. The computer program product according to claim 7, wherein said computer readable program code is configured to identify incorrect information via one or more of: user tagging and automatic data processing.

9. The computer program product according to claim 7, wherein said computer readable program code is configured to identify the relationship of the at least one other entity and the at least one entity via consulting historical diffusion in the network of information relating to the associated with the specific piece of information.

10. The computer program product according to claim 7, wherein said computer readable program code is configured to initiate the dissemination of correct information.

11. The computer program product according to claim 7, wherein the neutralizing is initiated automatically in response to the dissemination of incorrect information exceeding a predetermined threshold.

* * * * *